US012283388B2

(12) United States Patent
Wells et al.

(10) Patent No.: US 12,283,388 B2
(45) Date of Patent: Apr. 22, 2025

(54) METHOD TO SEPARATE ISOTOPES CREATED BY PHOTONUCLEAR REACTIONS

(71) Applicants: New Mexico Tech University Research Park Corporation, Socorro, NM (US); UNM Rainforest Innovations, Albuquerque, NM (US)

(72) Inventors: Douglas Wells, Socorro, NM (US); Nikolai Kalugin, Albuquerque, NM (US); Alexey Serov, Albuquerque, NM (US)

(73) Assignees: NEW MEXICO TECH UNIVERSITY RESEARCH PARK CORPORATION, Socorro, NM (US); UNM RAINFOREST INNOVATIONS, Albuquerque, NM (US)

( * ) Notice: Subject to any disclaimer, the term of this patent is extended or adjusted under 35 U.S.C. 154(b) by 740 days.

(21) Appl. No.: 17/519,801

(22) Filed: Nov. 5, 2021

(65) Prior Publication Data

US 2022/0108813 A1    Apr. 7, 2022

Related U.S. Application Data

(63) Continuation of application No. PCT/US2020/032402, filed on May 11, 2020.
(Continued)

(51) Int. Cl.
*G21G 1/12* (2006.01)
*B82Y 40/00* (2011.01)
*G21G 1/00* (2006.01)

(52) U.S. Cl.
CPC ............... *G21G 1/12* (2013.01); *G21G 1/001* (2013.01); *B82Y 40/00* (2013.01); *G21G 2001/0036* (2013.01)

(58) Field of Classification Search
CPC .. G21G 1/12; G21G 1/001; G21G 2001/0036; B82Y 40/00
(Continued)

(56) References Cited

U.S. PATENT DOCUMENTS 4,797,264 A      1/1989  Inoue et al.
5,586,153 A  *  12/1996  Alvord ..................... H05H 6/00
                                                     376/112
(Continued)

FOREIGN PATENT DOCUMENTS

WO    WO-2020231951 A1    11/2020

OTHER PUBLICATIONS

Berman, B.L. et al., Measurements of the giant dipole resonance with monoenergetic photons, Reviews of Modern Physics, 47(3):713-761, (1975).
(Continued)

*Primary Examiner* — Anita Nassiri-Motlagh
(74) *Attorney, Agent, or Firm* — WILSON SONSINI GOODRICH & ROSATI

(57) ABSTRACT

The widespread utilization and growing demand for radiopharmaceuticals are attributable to the development and availability of a range of radiopharmaceuticals. The present disclosure describes methods of making 3-dimensional nano-porous, micro-porous, meso-porous, or macro-porous materials. The present disclosure also describes methods of irradiating and separating isotopes using the 3-dimensional nano-porous, micro-porous, meso-porous, or macro-porous materials.

27 Claims, 7 Drawing Sheets

Related U.S. Application Data

(60) Provisional application No. 62/846,124, filed on May 10, 2019.

(58) Field of Classification Search
USPC .......................................................... 423/2
See application file for complete search history.

(56) References Cited

U.S. PATENT DOCUMENTS

| | | | |
|---|---|---|---|
| 6,645,444 | B2 | 11/2003 | Goldstein |
| 6,936,240 | B2 | 8/2005 | Park et al. |
| 8,449,850 | B2 | 5/2013 | Glenn et al. |
| 2014/0348284 | A1* | 11/2014 | Diamond ................ G21G 1/06 376/202 |

OTHER PUBLICATIONS

Bohr, A. et al., Nuclear Structure, volume II: Nuclear Deformations, Benjamin, NY, (1969).
Cheng, et al., Investigation of recoil collection method for production of high specific activity nuclear medicine isotopes, Med. Phys., 26(9):1843-1846, (1999).
Davids, C., Recoil Separators, (2002).
Harris, et al., Report of the Meeting Held to Discuss Existing and Future Radionuclide Requirements for the National Cancer Institute, SAIC report to the National Cancer Institute, 2008.
Hummers, W.S. et al., Preparation of graphitic oxide, Journal of the American Chemical Society, 80(6):1339, (1958).
Kabir, S. et al., Design of novel graphene materials as a support for palladium nanoparticles: highly active catalysts towards ethanol electrooxidation, Electrochimica Acta., 203:144-153, (2016).
Kabir, S. et al., Palladium nanoparticles supported on 3D-graphene nanosheets for oxygen reduction reactions in alkaline media, ECS Transactions, 72(29):39-47, (2016).
Levinger, U.S., The high energy nuclear photoeffect, Physical Review, 84(1):43-51, (1951).
Morinaga, et al., Radioactive Isotope Separation by Nuclear Recoil, Phys. Rev., 93(6): 1422, (1954).
PCT/US2020/03240 International Preliminary Report on Patentability dated Nov. 25, 2021.
PCT/US2020/03240 International Search Report and Written Opinion dated Oct. 8, 2020.
Rivard, et al., The U.S. National Isotope Program: Current Status and Strategy for Future Success, J. Applied Radiation and Isotopes, 63:157-178, (2005).
Santoro, C. et al., Three-dimensional graphene nanosheets as cathode catalysts in standard and supercapacitive microbial fuel cell, Journal of Power Sources, 356:371-380, (2017).
Varner, R.L. et al., Measurement of the E1 strength function of 11-Be, Oak Ridge National Lab Conference Proceedings, (1998).
Wells, Douglas Patrick, Elastic photon scattering from helium-4 between 23 and 73 MeV, University of Illinois at Urbana-Champaign ProQuest Dissertations & Theses, (1990).
Ziegler, et al., SRIM—The stopping and range of ions in matter, Nuclear Instruments and Methods in Physics Research, 268:1818-1823, (2010).

* cited by examiner

METHOD TO SEPARATE ISOTOPES CREATED BY PHOTONUCLEAR REACTIONS

CROSS-REFERENCE

This application is a continuation of PCT/US20/32402 filed May 11, 2020, which claims the benefit of U.S. Provisional Application No. 62/846,124, filed May 10, 2019, which are incorporated herein by reference.

BACKGROUND

Nuclear medicine uses radiotracers called radiopharmaceuticals to image organ function and disease states. Unlike other imaging modalities, such as computed tomography, magnetic resonance imaging, and ultrasonography, nuclear medicine procedures are capable of mapping physiological function and metabolic activity and can provide information about organ function and dysfunction. The widespread utilization and growing demand for radiopharmaceuticals are attributable to the development and availability of a range of radiopharmaceutical s.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY OF THE INVENTION

In some embodiments, disclosed herein is a method comprising: a) embedding a sample of atoms, each of which is a non-radioactive isotope, in a porous material; b) applying gamma radiation to the porous material, wherein the gamma radiation causes a portion of the atom to divide, each into a neutron and a radioactive isotope; c) after applying the gamma radiation to the porous material, removing an atom that is one of the non-radioactive isotopes from the porous material; and d) after removing the atom that is one of the non-radioactive isotopes from the porous material, processing the porous material to obtain the radioactive isotope.

BRIEF DESCRIPTION OF THE DRAWINGS

FIG. 5 RIGHT PANEL illustrates the placement of a 3D nano-porous, micro-porous, meso-porous, or macro-porous material in a reactor or deposition chamber in preparation for isotope separation.

DETAILED DESCRIPTION OF THE INVENTION

Figure 1:
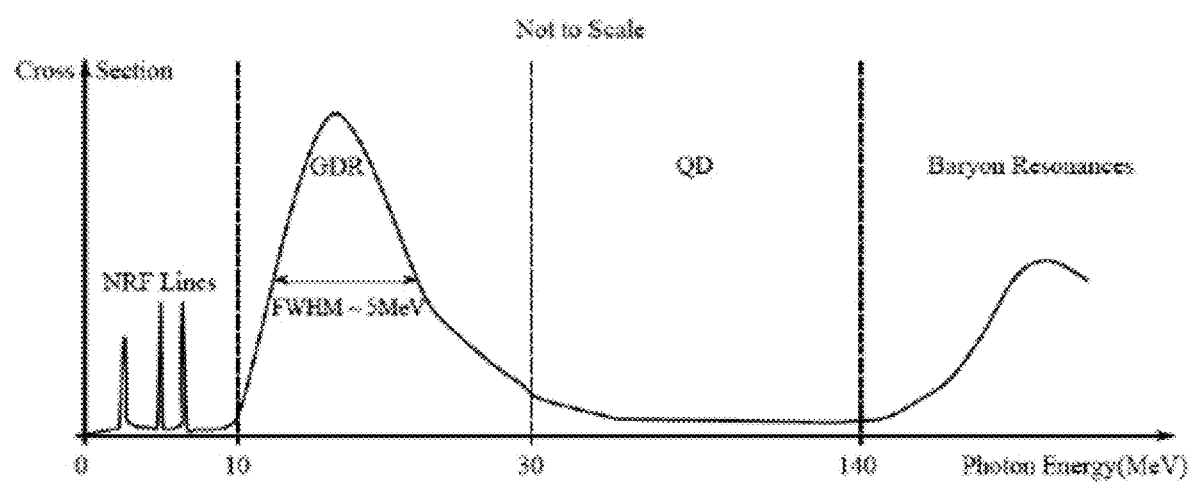
FIG. 1 shows the photo-absorption cross section as a function of photon energy.

Nuclear medicine is a medical specialty that uses radioactive tracers called radiopharmaceuticals to access bodily functions and to diagnose and/or treat diseases. Radioactive tracers are made up of carrier molecules that are bonded tightly to a radioactive atom. Some tracers employ molecules that interact with a specific protein or sugar in the body and can employ a patient's own cells. Single photon emission computed tomography (SPECT) and positron emission tomography (PET) scans are the two most common imaging modalities in nuclear medicine.

Nuclear medicine records radiation emitted from within the body rather than radiation that is generated by an external source, such as X-rays. Radiopharmaceuticals flow through different organs, and in some cases, are taken up by specific organs or tissue. The radiation that comes from the radiopharmaceutical is used to treat a disease or is detected by a camera to take pictures of the corresponding organ, region, or tissue. Radiopharmaceuticals can be inhaled, injected, or swallowed. The radioactive materials usually leave the body within hours to months.

Isotopes Used in Nuclear Medicine

Isotopes are atoms of the same element of the periodic table with different numbers of neutrons. Isotopes are used in applications such as agriculture, medicine, and the chemical manufacturing industries. In medicine, isotopes are widely used for diagnostics and treatments for illnesses. The most standard technique for isotope production is the fission of heavy atoms, for example, uranium-235.

Radioisotopes are used as radiopharmaceuticals in nuclear medicine. In some embodiments, the radioisotope used in nuclear medicine is $^{47}$Ca, $^{11}$C, $^{14}$C, $^{51}$Cr, $^{57}$Co, $^{58}$Co, $^{169}$Er, $^{18}$F, $^{67}$Ga, $^{68}$Ga, $^{3}$H, $^{111}$In, $^{123}$I, $^{125}$I, $^{131}$I, $^{59}$Fe, $^{81m}$Kr, $^{13}$N, $^{15}$O, $^{32}$P, $^{223}$Ra, $^{82}$Rb, $^{153}$Sm, $^{75}$Se, $^{22}$Na, $^{24}$Na, $^{89}$Sr, $^{99m}$Tc, $^{201}$Tl, $^{133}$Xe, or $^{90}$Y. In some embodiments, the collected radioisotope is $^{99m}$Tc.

In some embodiments, radioisotopes are used in ionic form, such as $Ca^{2+}$, $Cr^{3+}$, $Ga^{3+}$, $Fe^{2+}$, $Fe^{3+}$, $Na^+$, or $Tl^+$. In some embodiments, radioisotopes are incorporated into a pharmaceutical agent, such as L-methyl-methionine, glycocholic acid, para-amino benzoic acid, urea, d-xylose, ethylenediaminetetraacetic acid (EDTA), cyanocobalamin (vitamin $B_{12}$), fluorodeoxyglucose, sodium fluoride, fluorocholine, desmethoxy Fallypride, dotatoc, dotatate, prostate-specific membrane antigen (PSMA), water, diethylenetriaminepentaacetic acid (DTPA), leukocytes, platelets, pentetreotide, octreotide, iodohippurate, m-iodobenzylguanidine (MIBG), fibrinogen, ammonia, phosphate, ethylenediaminotetramethylenephosphoric acid (EDTMP), selenocholesterol, 23-seleno-25-homo-taurocholate, pertechnetate, human albumin, human albumin macroaggregates, human albumin microspheres, phosphonates and phosphates (MDP/HDP), dimercaptosuccinic acid (DMSA(V) or DMSA (III)), colloid, hepatic iminodiacetic acid (HIDA), denatured (heat-damaged) red blood cells, whole red blood cells, mercaptoacetyltriglycine (MAG3), exametazime (HMPAO), exametazime-labelled leucocytes, sestamibi, sulesomab, technegas, human immunoglobulin, tetrofosmin, ethyl cysteinate dimer (ECD), or silicate. In some embodiments, radioisotopes are used without attachment to a pharmaceutical agent.

Photo-Absorption and Kinematic Recoil Processes

The disclosure describes a method of separating radioisotopes from parent isotopes or elements using the photoabsorption-related kinematic recoil process. Gamma-radiation photons are used to trigger a photo-nuclear reaction of a target isotope. Gamma radiation photons can be generated using a beam of high-energy electrons via Bremsstrahlung radiation, synchrotron radiation (i.e. photon emission by a relativistic particle), cyclotron radiation (i.e. photon emission by a non-relativistic particle), and the emission of electrons and positrons during beta decay.

Bremsstrahlung radiation is electromagnetic radiation produced by the deceleration of a charged particle when the charged particle is decelerated in a medium. The moving particle loses kinetic energy, and the energy of the moving particle is used to generate photons. Bremsstrahlung radiation has a continuous spectrum.

The photo-absorption process is dependent on incident photon energy. The four approximate energy regimes are different for specific nuclear species. FIG. 1 shows the photo-absorption cross section as a function of photon energy. Region I: $E_\gamma \approx 0\text{-}10$ MeV; Region II: $E_\gamma \approx 10\text{-}30$ MeV; Region III: $E_\gamma \approx 30\text{-}140$ MeV; Region IV: $E_\gamma \approx 140$ MeV.

In some embodiments, Gamma-ray photons are generated using an electron beam of about 20 MeV, about 25 MeV, about 30 MeV, about 35 MeV, or about 40 MeV. In some embodiments, the end point energy cut off for Gamma radiation is about 30 MeV. In some embodiments, the end point energy cut off for Gamma radiation is about 30 MeV, and the 30 MeV energy point cut off provides a maximum photo-production flux in the energy range of about 10 to about 30 MeV (i.e., the giant dipole resonance (GDR) region). For $^{99}$Mo recoil spectrum generation, an electron beam of about 10 keV results in the peak number of recoiled $^{99}$Mo atoms.

Figure 2:
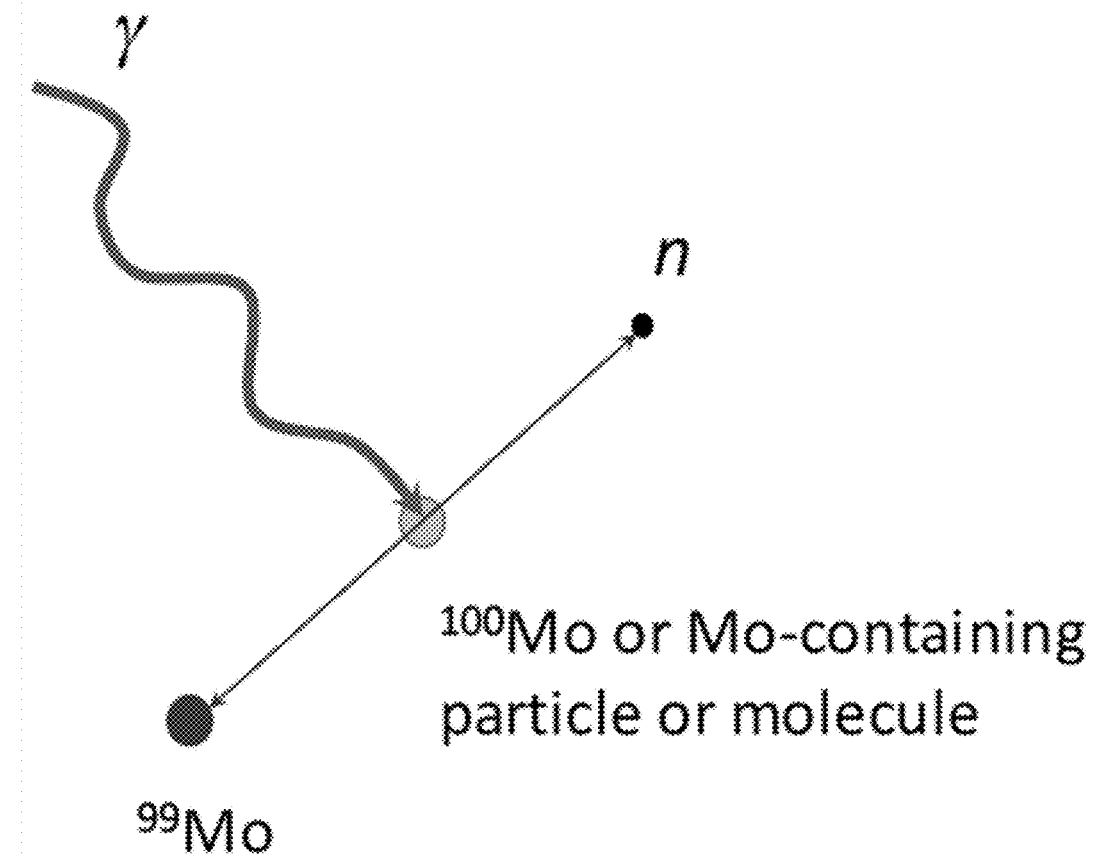
FIG. 2 shows an example experimental set up for using Bremsstrahlung radiation to activate isotopes.

FIG. 2 shows the experimental set up for using Bremsstrahlung radiation to activate isotopes. An electron beam is sent to a Bremsstrahlung converter. Bremsstrahlung radiation beams are sent through an Al beam hardener before being released. A sample can be placed in front of the Al beam hardener to subject a sample to Bremsstrahlung radiation.

Produced isotopes can be separated from parent main isotopes using chemical methods. In some embodiments, produced isotopes can be separated from parent main isotopes using extraction or ion exchange. In some embodiments, produced isotopes can be separated from parent main isotopes using physical methods.

Figure 3:
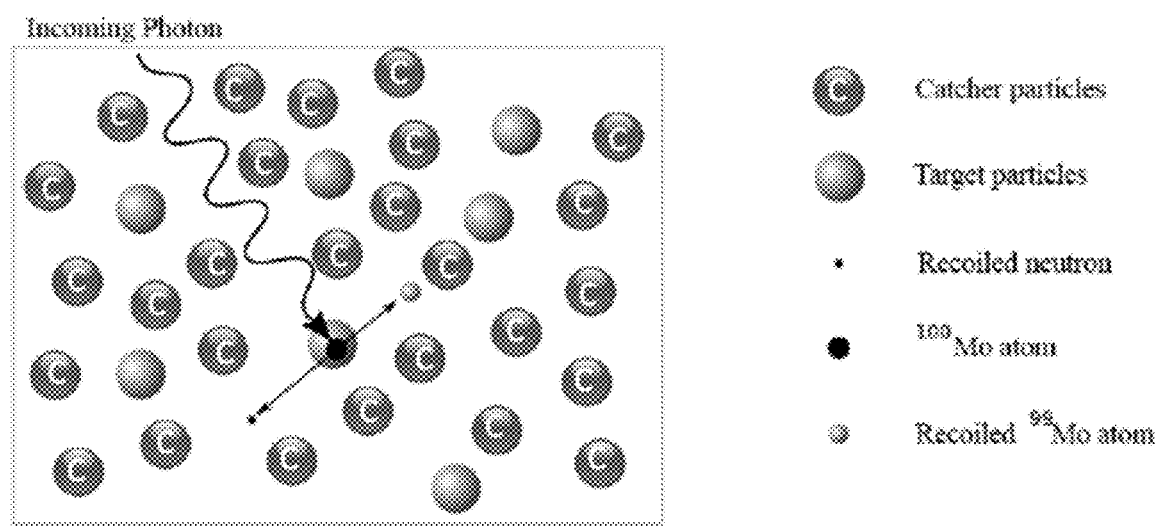
FIG. 3 illustrates the kinematics that occur when a photon is absorbed by $^{100}$Mo.

FIG. 3 illustrates the kinematics when a photon is absorbed by $^{100}$Mo. An incoming photon knocks a neutron out of $^{100}$Mo to result in recoiling of photo-produced $^{99}$Mo. The kinetic energy of some of the $^{99}$Mo ions can be big enough to escape the target peptide and get trapped in catcher particles (i.e., another substance in contact with the target). A greater fraction of $^{99}$Mo can be trapped in catcher particles for smaller targets (e.g., $^{100}$Mo or natural Mo).

3D Nano-Porous, Micro-Porous, Meso-Porous, or Macro-Porous Bodies

In some embodiments, disclosed herein is a method comprising: a) embedding a sample of atoms, each of which is a non-radioactive isotope, in a porous material; b) applying gamma radiation to the porous material, wherein the gamma radiation causes a portion of the atom to divide, each into a neutron and a radioactive isotope; c) after applying the gamma radiation to the porous material, removing an atom that is one of the non-radioactive isotopes from the porous material; and d) after removing the atom that is one of the non-radioactive isotopes from the porous material, processing the porous material to obtain the radioactive isotope.

In some embodiments, the sample comprises an isotope-containing compound, wherein the isotope-containing compound comprises a non-radioactive isotope. In some embodiments, the sample comprises an isotope-containing compound, wherein the isotope-containing compound comprises $^{100}$Mo.

The disclosure describes methods of separating isotopes using 3-dimensional (3D) nano-porous, micro-porous, meso-porous, or macro-porous bodies. In some embodiments, a 3D nano-porous, micro-porous, meso-porous, or macro-porous body of the disclosure is a porous matrix created from light elements. In some embodiments, a 3D nano-porous, micro-porous, meso-porous, or macro-porous body of the disclosure is made of carbon, aluminum, or an organic material. In some embodiments, a 3D nano-porous, micro-porous, meso-porous, or macro-porous body of the disclosure is made of an amorphous material. In some embodiments, the 3D nano-porous, micro-porous, meso-porous, or macro-porous bodies of the disclosure can be made of graphitic carbon, aluminum, inorganic polymers, or organic polymers. In some embodiments, a 3D nano-porous, micro-porous, meso-porous, or macro-porous body of the disclosure can comprise heteroatoms. In some embodiments, a 3D nano-porous, micro-porous, meso-porous, or macro-porous body of the disclosure can comprise nitrogen, boron, phosphorous, sulfur, or selenium atoms. In some embodiments, a 3D nano-porous, micro-porous, meso-porous, or macro-porous body of the disclosure can comprise an oxide, nitride, carbide, elements from groups 3, 4, 5, 6, 7, 8, 9, 10, 11, or 12 of the period table, or elements from periods 4, 5, or 6 of the period table.

In some embodiments, a 3D nano-porous, micro-porous, meso-porous, or macro-porous body of the disclosure is 3D nano-porous, micro-porous, meso-porous, or macro-porous carbon. In some embodiments, a 3D nano-porous, micro-porous, meso-porous, or macro-porous body of the disclosure is a 3D nano-porous, micro-porous, meso-porous, or macro-porous carbon sponge. In some embodiments, a 3D nano-porous, micro-porous, meso-porous, or macro-porous body of the disclosure is a 3D nano-porous, micro-porous, meso-porous, or macro-porous carbon lattice.

The 3D porous bodies of the disclosure can have micro- and meso-porosity or a mean porosity from about 1 nm to about 45 nm. In some embodiments, the 3D porous bodies of the disclosure can have porosity or a mean porosity of about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 39 nm, about 40 nm, about 41 nm, about 42 nm, about 43 nm, about 44 nm, about 45 nm, about 46 nm, about 47 nm, about 48 nm, about 49 nm, or about 50 nm. In some embodiments, the 3D porous body of the disclosure has a mean porosity of about 20 nm. In some embodiments, the 3D porous body of the disclosure has a mean porosity of about 50 nm.

The wall thickness or mean thickness between pores of the 3D nano-porous, micro-porous, meso-porous, or macro-porous bodies can be from about 0.1 nm to about 10 nm. In some embodiments, the wall thickness or mean thickness between pores of the 3D nano-porous, micro-porous, meso-porous, or macro-porous bodies can be about 0.1 nm, about 0.5 nm, about 1.5 nm, about 2 nm, about 2.5 nm, about 3 nm, about 3.5 nm, about 4 nm, about 4.5 nm, about 5 nm, about 5.5 nm, about 6 nm, about 6.5 nm, about 7 nm, about 7.5 nm, about 8 nm, about 8.5 nm, about 9 nm, about 9.5 nm, about 10 nm, about 10.5 nm, about 11 nm, about 11.5 nm, or about 12 nm.

The surface area or mean surface area of the 3D nano-porous, micro-porous, meso-porous, or macro-porous bodies of the disclosure can be from about 300 $m^2$ $g^{-1}$ to about 1800 $m^2$ $g^{-1}$. In some embodiments, the surface area or mean surface area of the 3D nano-porous, micro-porous, meso-porous, or macro-porous bodies of the disclosure can be about 300 $m^2$ $g^{-1}$, about 400 $m^2$ $g^{-1}$, about 500 $m^2$ $g^{-1}$, about 600 $m^2$ $g^{-1}$, about 700 $m^2$ $g^{-1}$, about 800 $m^2$ $g^{-1}$, about 900 $m^2$ $g^{-1}$, about 1000 $m^2$ $g^{-1}$, about 1100 $m^2$ $g^{-1}$, about 1200 $m^2$ $g^{-1}$, about 1300 $m^2$ $g^{-1}$, about 1400 $m^2$ $g^{-1}$, about 1500 $m^2$ $g^{-1}$, about 1600 $m^2$ $g^{-1}$, about 1700 $m^2$ $g^{-1}$, about 1800 $m^2$ $g^{-1}$, about 1900 $m^2$ $g^{-1}$, or about 2000 $m^2$ $g^{-1}$. In some embodiments, the surface area or mean surface area of the 3D nano-porous, micro-porous, meso-porous, or macro-porous bodies of the disclosure can be about 600 $m^2$ $g^{-1}$. In some embodiments, the surface area or mean surface area of the 3D nano-porous, micro-porous, meso-porous, or macro-porous bodies of the disclosure can be about 900 $m^2$ $g^{-1}$. In some embodiments, the surface area or mean surface area of the 3D nano-porous, micro-porous, meso-porous, or macro-porous bodies of the disclosure can be about 1200 $m^2$ $g^{-1}$.

The 3D nano-porous, micro-porous, meso-porous, or macro-porous materials of the disclosure are constructed at a nano-scale in at least one dimension. In some embodiments, the 3D nano-porous, micro-porous, meso-porous, or macro-porous material is a solid. In some embodiments, the 3D nano-porous, micro-porous, meso-porous, or macro-porous material is a liquid or a gas that is encapsulated in a crystalline lattice. In some embodiments, the 3D nano-porous, micro-porous, meso-porous, or macro-porous material is a liquid or a gas that is encapsulated in a carbon lattice.

Figure 4:
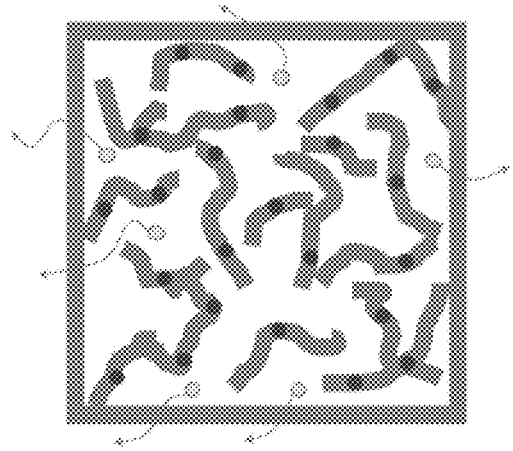
FIG. 4 Panels A, B, and C illustrate the process of producing and separating isotopes using 3D nano-porous, micro-porous, meso-porous, or macro-porous materials.
Figure 4:
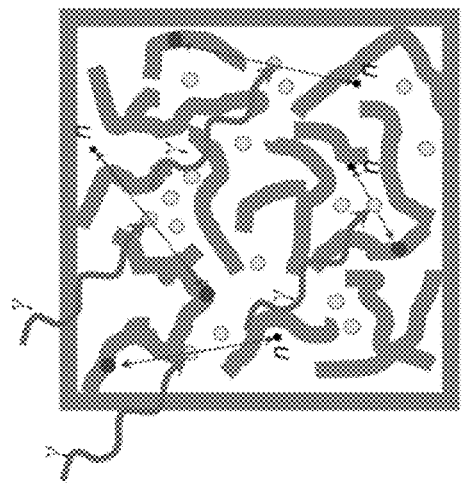
Figure 4:
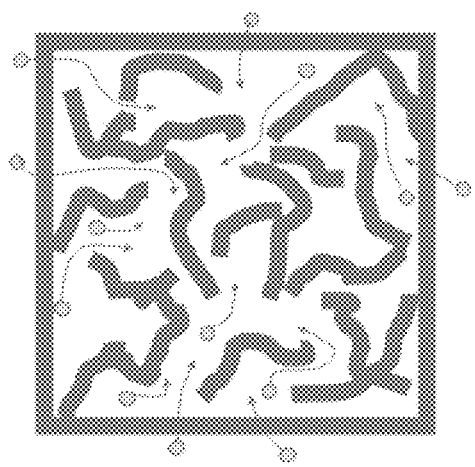

The process of producing and separating isotopes with materials of the disclosure are illustrated in FIG. 4 Panels A, B, and C. The open circles symbolize parent isotopes or parent isotope-containing compounds. The filled circles symbolize newly generated isotopes.

FIG. 4 Panel A illustrates how the pores of meso-porous material of the disclosure are first filled with parent isotopes or parent isotope-containing compounds. FIG. 4 Panel B illustrates irradiation of the material filled with parent isotopes or parent isotope-containing compounds with gamma radiation. The radiation recoil method generates isotopes and neutrons (marked with n) during irradiation of parent isotopes with gamma radiation (arrows marked with γ). Gamma irradiation generates isotopes with non-zero kinetic energy, which are stopped and captured by the meso-porous material. FIG. 4 Panel C illustrates the removal of the parent isotope or parent isotope-containing compound from the meso-porous material. The newly generated isotopes remain captured in the meso-porous material, and are thus separated from the parent isotope or parent isotope-containing compound.

The 3D nano-porous, micro-porous, meso-porous, or macro-porous bodies of the disclosure can be used to separate isotope-containing compounds. In some embodiments, the isotope-containing compound is an element, for example, $^{100}$Mo. In some embodiments, the isotope-containing compound is a nanoparticle, oxide, or salt of an element. In some embodiments, the isotope-containing compound can have a particle size or a mean particle size of about 1 nm, about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 90 nm, about 95 nm, or about 100 nm.

An isotope or isotope-containing compound is delivered to the 3D nano-porous, micro-porous, meso-porous, or macro-porous material for radiation and separation. In some embodiments, an isotope or isotope-containing compound can be dissolved in water and delivered to the 3D nano-porous, micro-porous, meso-porous, or macro-porous material. In some embodiments, an isotope or isotope-containing compound can be dissolved in a volatile carrier fluid, such an organic solvent. In some embodiments, an isotope or isotope-containing compound can be dissolved in ethanol, methanol, propanol, acetone, methylene chloride, ethyl acetate, or hexanes.

In some embodiments, an isotope or isotope-containing compound is delivered to a 3D nano-porous, micro-porous, meso-porous, or macro-porous material, and the carrier fluid is evaporated, for example, at room temperature. In some embodiments, an isotope or isotope-containing compound is delivered to a 3D nano-porous, micro-porous, meso-porous, or macro-porous material, and the carrier fluid is evaporated, for example, under reduced pressure. In some embodiments, an isotope or isotope-containing compound is delivered to a 3D nano-porous, micro-porous, meso-porous, or macro-porous material, and the carrier fluid is evaporated using heat. In some embodiments, the filled material can be reduced in solution using, for example, a soft chemical reducing agent. In some embodiments, the filled material can be reduced in solution using hydrazine, sodium borohydride, diborane, dithionates, thiosulfates, iodides, diisobutylaluminum hydride (DIBAL-H), oxalic acid, formic acid, or ascorbic acid. In some embodiments, the filled material can be reduced in solution using heat reduction under a hydrogen atmosphere. In some embodiments, the filled material can be reduced using hydrazine. In some embodiments, the filled material can be reduced using sodium borohydride. In some embodiments, the filled material can be reduced using hydrogen produced in situ.

After an isotope or isotope-containing compound is irradiated, the inactive target material (e.g., $^{100}$Mo) can be removed from the 3D nano-porous, micro-porous, meso-porous, or macro-porous body. In some embodiments, an inactive target material can be removed from the 3D nano-porous, micro-porous, meso-porous, or macro-porous body by washing the porous body. In some embodiments, an inactive target material can be removed from the 3D nano-porous, micro-porous, meso-porous, or macro-porous body by treating the inactive target material to increase the inactive target material's solubility. In some embodiments, the inactive target material can be removed from the 3D nano-porous, micro-porous, meso-porous, or macro-porous body by treating the inactive target material with a Cl-containing compound or with an acid, and washing the treated inactive target material away from the 3D nano-porous, micro-porous, meso-porous, or macro-porous material. In some embodiments, the inactive target material can be treated with chlorine gas or carbon monoxide to make the inactive target material volatile (e.g., $MoCl_5$ or $Mo(CO)_6$)).

The active isotope embedded in the pores of the 3D nano-porous, micro-porous, meso-porous, or macro-porous material can be separated from the 3D nano-porous, microporous, meso-porous, or macro-porous material. In some embodiments, the active isotope is separated from the 3D nano-porous, micro-porous, meso-porous, or macro-porous material by burning the 3D nano-porous, micro-porous, meso-porous, or macro-porous material in ambient air. In some embodiments, the active isotope is separated from the 3D nano-porous, micro-porous, meso-porous, or macro-porous material by burning the 3D nano-porous, micro-porous, meso-porous, or macro-porous material in an oxygen atmosphere. In some embodiments, the active isotope can be isolated in an unoxidized form by burning the 3D nano-porous, micro-porous, meso-porous, or macro-porous material at a low temperature, for example, 150° C. In some embodiments, the active isotope can be isolated as an oxide by burning the 3D nano-porous, micro-porous, meso-porous, or macro-porous material at a higher temperature, for example, about 200° C., about 250° C., about 300° C., about 350° C., about 400° C., about 450° C., about 500° C., about 550° C., about 600° C., about 650° C., about 700° C., about 750° C., or about 800° C. In some embodiments, the active isotope can be isolated as an oxide by burning the 3D nano-porous, micro-porous, meso-porous, or macro-porous material at a higher temperature, for example, about 1000° C., about 1100° C., about 1200° C., about 1300° C., about 1400° C., about 1500° C., about 1600° C., about 1700° C., about 1800° C., about 1900° C., or about 2000° C.

The 3D nano-porous, micro-porous, meso-porous, or macro-porous material of the disclosure can be used to separate small and large amounts of a daughter isotope from a parent isotope. In some embodiments, the 3D nano-porous, micro-porous, meso-porous, or macro-porous material of the disclosure can be used to separate about 100 mg, about 200 mg, about 300 mg, about 400 mg, about 500 mg, about 600 mg, about 700 mg, about 800 mg, about 900 mg, or about 1000 mg of a daughter isotope from a parent isotope. In some embodiments, the 3D nano-porous, micro-porous, meso-porous, or macro-porous material of the disclosure can be used to separate about 1 g, about 10 g, about 20 g, about 30 g, about 40 g, about 50 g, about 60 g, about 70 g, about 80 g, about 90 g, about 100 g, about 110 g, about 120 g, about 130 g, about 140 g, or about 150 g of a daughter isotope. In some embodiments, the 3D nano-porous, micro-porous, meso-porous, or macro-porous material of the disclosure can be used to separate about 100 g, about 200 g, about 300 g, about 400 g, about 500 g, about 600 g, about 700 g, about 800 g, about 900 g, or about 1000 g of a daughter isotope from a parent isotope. In some embodiments, the 3D nano-porous, micro-porous, meso-porous, or macro-porous material of the disclosure can be used to separate about 1 kg, about 2 kg, about 3 kg, about 4 kg, about 5 kg, about 6 kg, about 7 kg, about 8 kg, about 9 kg, or about 10 kg of a daughter isotope from a parent isotope.

Method of Making 3D Nano-Porous, Micro-Porous, Meso-Porous, or Macro-Porous Bodies The disclosure describes methods of preparing 3D nano-porous, micro-porous, meso-porous, or macro-porous body to irradiate and separate radioisotopes. A carbon precursor is used to form the porous matrix of the 3D nano-porous, micro-porous, meso-porous, or macro-porous bodies of the disclosure. In some embodiments, organic molecules containing carbon and/or heteroatoms are used to form the porous matrix of the 3D nano-porous, micro-porous, meso-porous, or macro-porous bodies of the disclosure. In some embodiments, doping additives can be used to control the chemical properties of the 3D nano-porous, micro-porous, meso-porous, or macro-porous bodies. In some embodiments, doping additives can be used to control the morphological properties of the 3D nano-porous, micro-porous, meso-porous, or macro-porous bodies. Removable supports can be used to control the formation of pores. In some embodiments, removable supports such as pore formers, silica, or MgO can be used to control the formation of pores. Solvents can be used to control the dispersion of the components of the 3D nano-porous, micro-porous, meso-porous, or macro-porous bodies.

The resulting composite material is heated to dry the resulting colloidal solution, for example, using a pre-heated dry oven. In some embodiments, the composite material is heated to about 80° C., about 100° C., about 200° C., about 250° C., about 300° C., about 350° C., about 400° C., about 450° C., about 500° C., about 550° C., about 600° C., about 650° C., about 700° C., about 750° C., about 800° C., about 850° C., about 900° C., about 950° C., about 1000° C., about 1050° C., about 1100° C., about 1150° C., or about 1200° C. In some embodiments, the composite material is heated in air. In some embodiments, the composite material is heated under a hydrogen atmosphere. In some embodiments, the composite material can be heated under a reactive atmosphere. In some embodiments, the composite material can be heated under a reactive atmosphere of ammonia, chlorine, fluorine, or HF gas. In some embodiments, the composite material can be heated under an inert atmosphere. In some embodiments, the composite material can be heated under an inert atmosphere of $N_2$, Ar, or He.

The resulting dry composite material can be washed to remove impurities. In some embodiments, the dry composite material is washed with water. In some embodiments, the dry composite material is washed with HF. In some embodiments, the dry composite material is washed with a mineral acid, for example, nitric acid, hydrochloric acid, or sulfuric acid. In some embodiments, the dry composite material is washed with an organic acid, for example, formic acid or acetic acid.

Applications

The method described herein can be used to generate and isolate isotopes for use in various applications. The disclosure describes methods of separating isotopes at a commercial scale using kinematic recoil. In some embodiments, the method is used for medical isotope production. In some embodiments, the method of the disclosure enables the photo-production of proton-rich isotopes that nuclear reactors cannot produce. In some embodiments, the method of the disclosure can be used in electron accelerators and isotope production facilities to produce radioisotopes.

In some embodiments, isolated radioisotopes can be used in nuclear medicine to treat diseases such as hyperthyroidism, thyroid cancer, lymphomas, and bone pain from some types of cancer. In some embodiments, isolated radioisotopes can be used in nuclear medicine to identify abnormal lesions deep in the body without exploratory surgery or to determine if certain organs are functioning normally. In some embodiments, nuclear medicine can determine whether or not the heart can pump blood adequately, whether the brain is receiving an adequate blood supply, and whether brain cells are functioning properly. In some embodiments, nuclear medicine can determine whether a patient's kidneys are functioning normally, and whether the stomach is emptying properly. In some embodiments, nuclear medicine can determine a patient's blood volume, lung function, vitamin absorption, and bone density. In some embodiments, nuclear medicine can locate small bone fractures before the fracture can be seen on an x-ray. In some embodiments, nuclear medicine can identify sites of seizures (epilepsy), Parkinson's disease, and Alzheimer's disease. In some embodiments, nuclear medicine can detect cancer and determine whether cancer cells are responding to treatment, and determine whether infected bones will heal. In some embodiments, nuclear medicine procedures can assess damage to the heart after a heart attack. In some embodiments, nuclear medicine can indicate how well newly transplanted organs are functioning.

TABLE 1 shows examples of radionucleotides that are used in nuclear medicine with corresponding half-lives, type of radioactive decay, and medical applications.

TABLE 1

| Radionuclide | Half-life | Decay | Applications |
| --- | --- | --- | --- |
| Bismuth-213 | 46 minutes | α | Cancer therapy |
| Cobalt-60 | 5.27 years | γ | Sterilization |
| Erbium-169 | 9.4 days | β⁻ | Relief of pain from arthritis |
| Iodine-125 | 60 days | γ | Treatment of brain and prostate cancer |
| Phosphorous-32 | 14 days | β | Treatment of excess red blood cells |
| Technetium-99m | 6 hours | γ | Imaging applications |
| Thallium-201 | 73 hours | γ | Diagnosis of coronary artery disease |
| Xenon-133 | 5 days | β⁻ | Pulmonary ventilation studies |

Isotopes isolated using the method of the disclosure can also be used in nuclear security and nuclear research. In some embodiments, isotopes isolated using the method of the disclosure can be used in security applications, well-logging and densitometry, sterilization of medical equipment and supplies, calibrations of equipment, and educational purposes.

EXAMPLES

Example 1: Methods and Materials

Mo atomic layer deposition (ALD) nanoparticles and films were made with ALD using MoF6, (bicyclo[2.2.1]hepta-2,5-diene)tetracarbonylmolybdenum(0), bis(cyclopentadienyl)molybdenum(IV) dichloride, cyclopentadienylmolybdenum(II) tricarbonyl, dimer, molybdenumhexacarbonyl, or (propylcyclopentadienyl)molybdenum(I) tricarbonyl dimer. The precursors were supplied to an ALD reactor with ultra-high purity (UHP) nitrogen carrier gas. The reactor was filled with carrier material (3D carbon-based matrix). The temperature of the reactor was varied between 100° C.-500° C.

Examples of ALD reactors used included a hot wall viscous flow reactor and a cold wall high vacuum reactor. The base pressure of the reactor in the viscous flow ALD reactor was set between 0.1 Torr-4.3 Torr with a N₂/Ar, another inert gas, or reactive gas flow of 10 sccm-10000 sccm using a pump. The high vacuum apparatus consisted of a carrier introduction chamber and two reaction chambers. In general, one of the reaction chambers used for carrier cleaning and activation using hydrogen atoms was produced by the dissociation of H₂ on a W filament. After cleaning, the carrier was transferred into the second reaction chamber that was used for ALD growth using static exposures of the Mo ALD precursors described above.

Example 2: Preparation of Microporous Highly-Graphitic Carbon with a Surface Area of 1200 m² g⁻¹

125 g of sucrose was dissolved in 500 mL of water. To the solution of sucrose, 23.7 g of cobalt nitrate was added under vigorous stirring. 75 g of magnesium nitrate was added to the mixture. The resulting clear solution was heated to 85° C., and 200 mL of 25 wt % NH₄OH was added to the heated solution. The resulting colloidal solution was placed into a dry oven pre-heated to 90° C., and water was evaporated for 11 h. The obtained composite material was heated in a nitrogen atmosphere at 1100° C. and held for 3 h. After cooling down the material, the material was washed with 4M HNO₃ for 72 h. The resulting black powder was washed with deionized water until the pH was about 7.

Example 3: Preparation of Meso-Porous Graphene with a Surface Area of 600 m² g⁻¹

312 g of graphene oxide was dispersed in 1000 mL of water, and 750 g of silica was added under vigorous stirring. The obtained colloidal solution was placed into a dry oven pre-heated to 90° C. and water was evaporated for 11 h. The obtained composite material was heated in a hydrogen atmosphere to 700° C. and held for 1 h. After cooling down the material, the material was washed with 40 wt % HF for 96 h. The resulting black powder was washed with deionized water until the pH was about 7.

Example 4: Preparation of Meso-Porous Boron-Doped Carbon with Surface Area 900 m² g⁻¹

12 g of glucose was dissolved in 200 mL of water, and 10 g of boric acid was added under vigorous stirring. 28.84 g of silica was added to the clear solution. The obtained colloidal solution was placed into a dry oven pre-heated to 50° C., and water was evaporated for 5 h. The obtained composite material was heated in a hydrogen atmosphere to 975° C. and held for 8 h. After cooling down the material, the material was washed with 40 wt % of HF for 96 h. The resulting black powder was washed with deionized water until the pH was about 7.

Example 5: Photonuclear Reaction to Separate Isotopes

Figure 5:
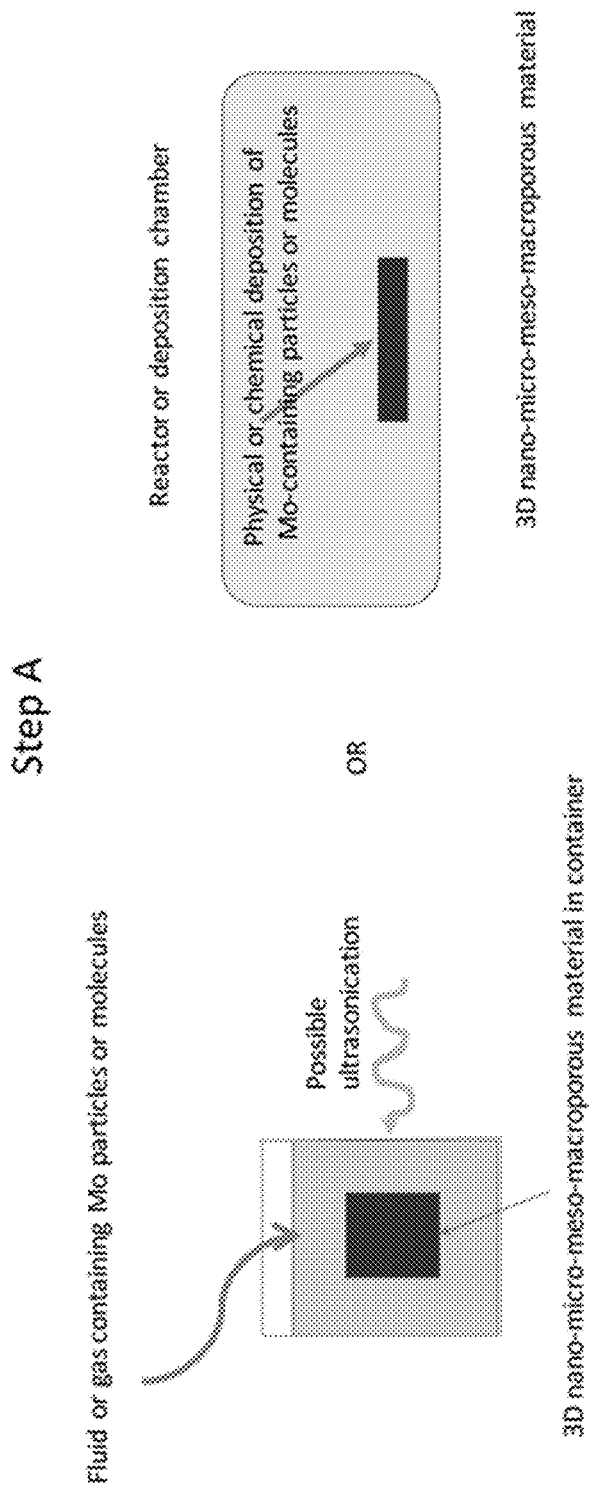
FIG. 5 LEFT PANEL illustrates the placement of a 3D nano-porous, micro-porous, meso-porous, or macro-porous material is placed in a container in preparation for isotope separation.

A 3D nano-porous, micro-porous, meso-porous, or macro-porous material is placed in a container. The container is filled with a fluid or gas containing Mo particles or other molecules. The container is subjected to ultrasonification. FIG. 5 LEFT PANEL illustrates the placement of a 3D nano-porous, micro-porous, meso-porous, or macro-porous material is placed in a container in preparation for isotope separation.

A 3D nano-porous, micro-porous, meso-porous, or macro-porous material is placed in a reactor or deposition chamber. Mo-containing particles or molecules are deposited onto the 3D nano-porous, micro-porous, meso-porous, or macro-porous material using physical or chemical deposition. FIG. 5 RIGHT PANEL illustrates the placement of a 3D nano-porous, micro-porous, meso-porous, or macro-porous material in a reactor or deposition chamber in preparation for isotope separation.

Figure 6:
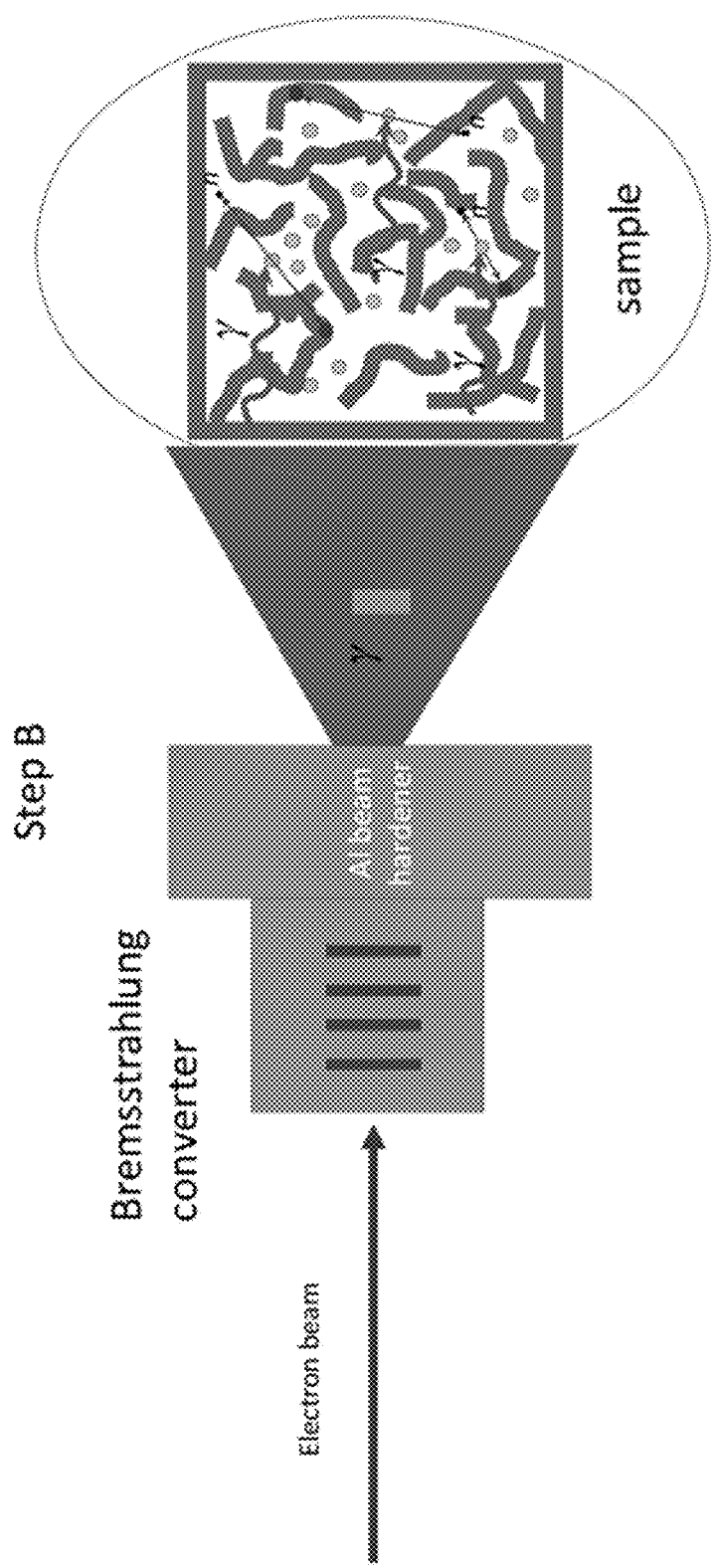
FIG. 6 illustrates a method of irradiating an isotope or isotope-containing material embedded in a 3D nano-porous, micro-porous, meso-porous, or macro-porous material using gamma radiation.

The 3D nano-porous, micro-porous, meso-porous, or macro-porous material embedded with Mo particles or molecules placed in a container or reactor/deposition chamber is placed in front of a Bremsstrahlung converter connected to an Al beam hardener. The 3D nano-porous, micro-porous, meso-porous, or macro-porous material is subjected to gamma radiation. FIG. 6 illustrates a method of irradiating an isotope or isotope-containing compound embedded in a 3D nano-porous, micro-porous, meso-porous, or macro-porous material using gamma radiation.

Figure 7:
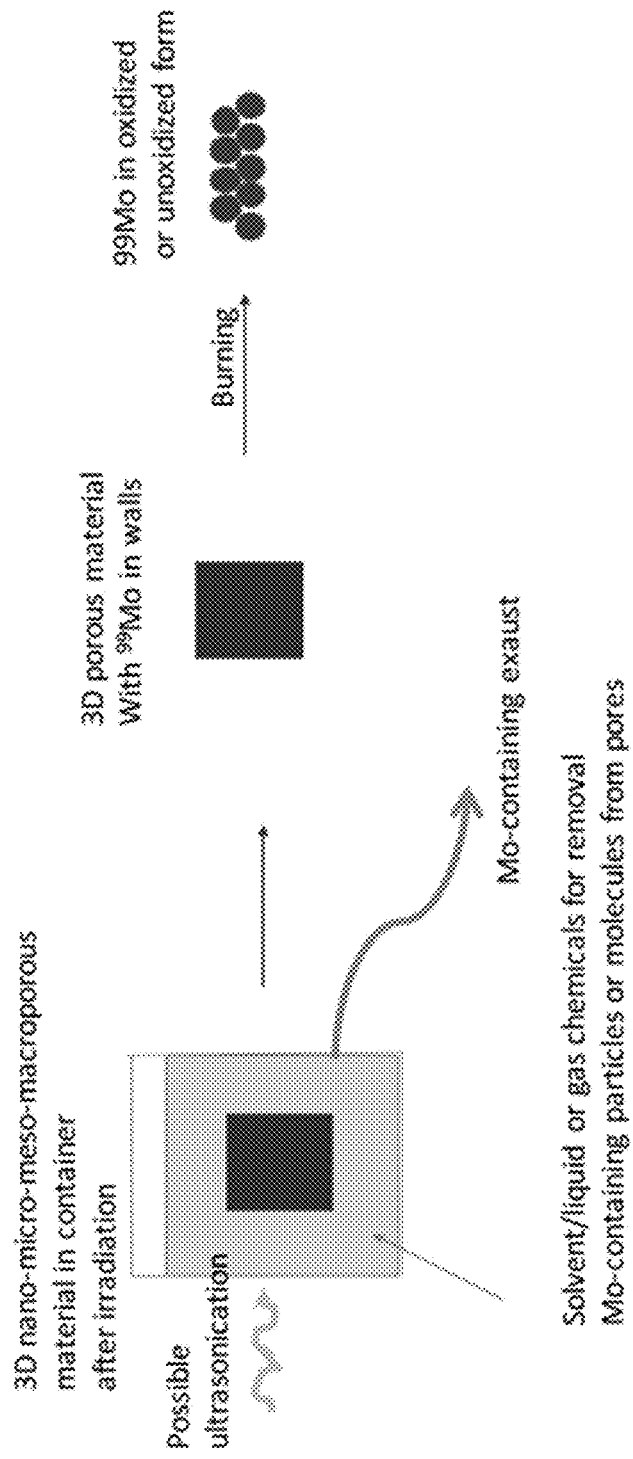
FIG. 7 illustrates the steps of removing irradiated isotopes from a 3D nano-porous, micro-porous, meso-porous, or macro-porous material using ultrasonification and combustion.

The irradiated isotopes from a 3D nano-porous, micro-porous, meso-porous, or macro-porous material are separated from the 3D matrix. The container or reactor/deposition chamber containing the 3D nano-porous, micro-porous, meso-porous, or macro-porous material is subjected to ultra-sonification and/or Mo-containing exhaust. A solvent or liquid is added to the container or reactor/deposition chamber to remove the Mo-containing particles or molecules from the pores of the 3D nano-porous, micro-porous, meso-porous, or macro-porous material. The 3D nano-porous, micro-porous, meso-porous, or macro-porous material is removed from the container or reactor/deposition chamber and burned to separate $^{99}$Mo in an oxidized or unoxidized form. FIG. 7 illustrates the steps of removing irradiated isotopes from a 3D nano-porous, micro-porous, meso-porous, or macro-porous material using ultrasonification and combustion.

What is claimed is:

1. A method comprising:
   a) embedding a sample of atoms, each of which is a non-radioactive isotope, in a porous material;
   b) applying gamma radiation to the porous material, wherein the gamma radiation causes a portion of the atoms to divide, each into a neutron and a radioactive isotope;
   c) after applying the gamma radiation to the porous material, removing an atom that is one of the non-radioactive isotopes from the porous material; and
   d) after removing the atom that is one of the non-radioactive isotopes from the porous material, processing the porous material to obtain the radioactive isotope.

2. The method of claim 1, wherein the non-radioactive isotope is $^{100}$Mo.

3. The method of claim 1, wherein the radioactive isotope is $^{99}$Mo.

4. The method of claim 2, wherein the sample comprises an isotope-containing compound as a particle, wherein the isotope-containing compound comprises $^{100}$Mo, and wherein the isotope-containing compound has a mean particle size of about 1 nm to about 100 nm.

5. The method of claim 4, wherein the mean particle size is about 20 nm.

6. The method of claim 4, wherein the mean particle size is about 50 nm.

7. The method of claim 1, wherein the gamma radiation has a photon energy of about 10 MeV to about 30 MeV.

8. The method of claim 7, wherein the photon energy is about 30 MeV.

9. The method of claim 1, wherein the porous material is a nano-porous material.

10. The method of claim 1, wherein the porous material is a meso-porous material.

11. The method of claim 10, wherein the meso-porous material is meso-porous carbon.

12. The method of claim 11, wherein the meso-porous carbon is a meso-porous carbon sponge.

13. The method of claim 11, wherein the meso-porous carbon is a meso-porous carbon lattice.

14. The method of claim 1, wherein the porous material has a mean porosity from about 1 nm to about 45 nm.

15. The method of claim 1, wherein the porous material has a mean surface area from about 300 m$^2$ g$^{-1}$ to about 1800 m$^2$ g$^{-1}$.

16. The method of claim 15, wherein the mean surface area is about 600 m$^2$ g$^{-1}$.

17. The method of claim 15, wherein the mean surface area is about 900 m$^2$ g$^{-1}$.

18. The method of claim 1, wherein the non-radioactive isotope is embedded in the porous material by flowing a carrier fluid comprising the non-radioactive isotope through the porous material.

19. The method of claim 18, wherein the carrier fluid is water.

20. The method of claim 18, wherein the carrier fluid is an alcohol.

21. The method of claim 1, wherein the removing the atom that is one of the non-radioactive isotopes from the porous material comprises reducing the non-radioactive isotope in solution.

22. The method of claim 21, wherein the reducing is performed using hydrazine.

23. The method of claim 21, wherein the reducing is performed using sodium borohydride.

24. The method of claim 1, wherein the processing the material comprises combusting the porous material.

25. The method of claim 24, wherein the combusting is performed at a temperature of about 200° C. to about 1000° C.

26. The method of claim 24, wherein the combusting is performed at a temperature of about 1000° C. to about 2000° C.

27. The method of claim 1, further comprising collecting technetium-99m ($^{99m}$Tc) from the porous material.

* * * * *